(12) United States Patent
Reardon et al.

(10) Patent No.: US 8,131,650 B2
(45) Date of Patent: *Mar. 6, 2012

(54) SYSTEM AND METHOD FOR DISTRIBUTING INFORMATION

(75) Inventors: George Ronald Reardon, Lawrenceville, GA (US); Patricia Carol Hammock, Marietta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1110 days.

This patent is subject to a terminal disclaimer.

(21) Appl. No.: 11/960,892

(22) Filed: Dec. 20, 2007

(65) Prior Publication Data

US 2008/0097874 A1   Apr. 24, 2008

Related U.S. Application Data

(63) Continuation of application No. 10/133,731, filed on Apr. 26, 2002, now Pat. No. 7,328,163.

(51) Int. Cl.
G06Q 10/00 (2006.01)
(52) U.S. Cl. ...................................................... 705/313
(58) Field of Classification Search ................... 705/313
See application file for complete search history.

(56) References Cited

U.S. PATENT DOCUMENTS

| | | | |
|---|---|---|---|
| 4,962,457 A | 10/1990 | Chen et al. | |
| 5,493,291 A | 2/1996 | Bruggemann | |
| 5,654,696 A | 8/1997 | Barrett et al. | |
| 6,437,692 B1 | 8/2002 | Petite et al. | |
| 6,973,432 B1 * | 12/2005 | Woodard et al. | 705/313 |
| 7,177,819 B2 | 2/2007 | Muncaster et al. | |
| 2002/0019712 A1 | 2/2002 | Petite et al. | |

FOREIGN PATENT DOCUMENTS

EP   1072992 A2 *   1/2001

OTHER PUBLICATIONS

AllNetDevices-Mercedes Demos Drive-By Info Gathering, www.allnetdevices.com/wireless/news/2001/11/13/mercedes_demos.html, Feb. 27, 2002 (3 pgs.).
Mercedes-Benz Unveils Future Telematics System, www.mobileinfo.com/News_2001/Issue47/Mercedes_C320.htm, Feb. 27, 2002 (2 pgs.).
Press Release, SUPRA Introduces new eKey Portable Digital Organizer to Enhance REALTOR Professionalism and Productivity, Nov. 1, 1999.

* cited by examiner

Primary Examiner — Naresh Vig
(74) Attorney, Agent, or Firm — Cantor Colburn LLP

(57) ABSTRACT

A system for marketing real estate includes a property data device and a personal data device. The property data device is to be located in the vicinity of a real estate property, and the personal data device is to be provided to a user. The property data device is operable to transmit the property information data, and the personal data device operable to receive and store the property information data transmitted by the property data device.

14 Claims, 13 Drawing Sheets

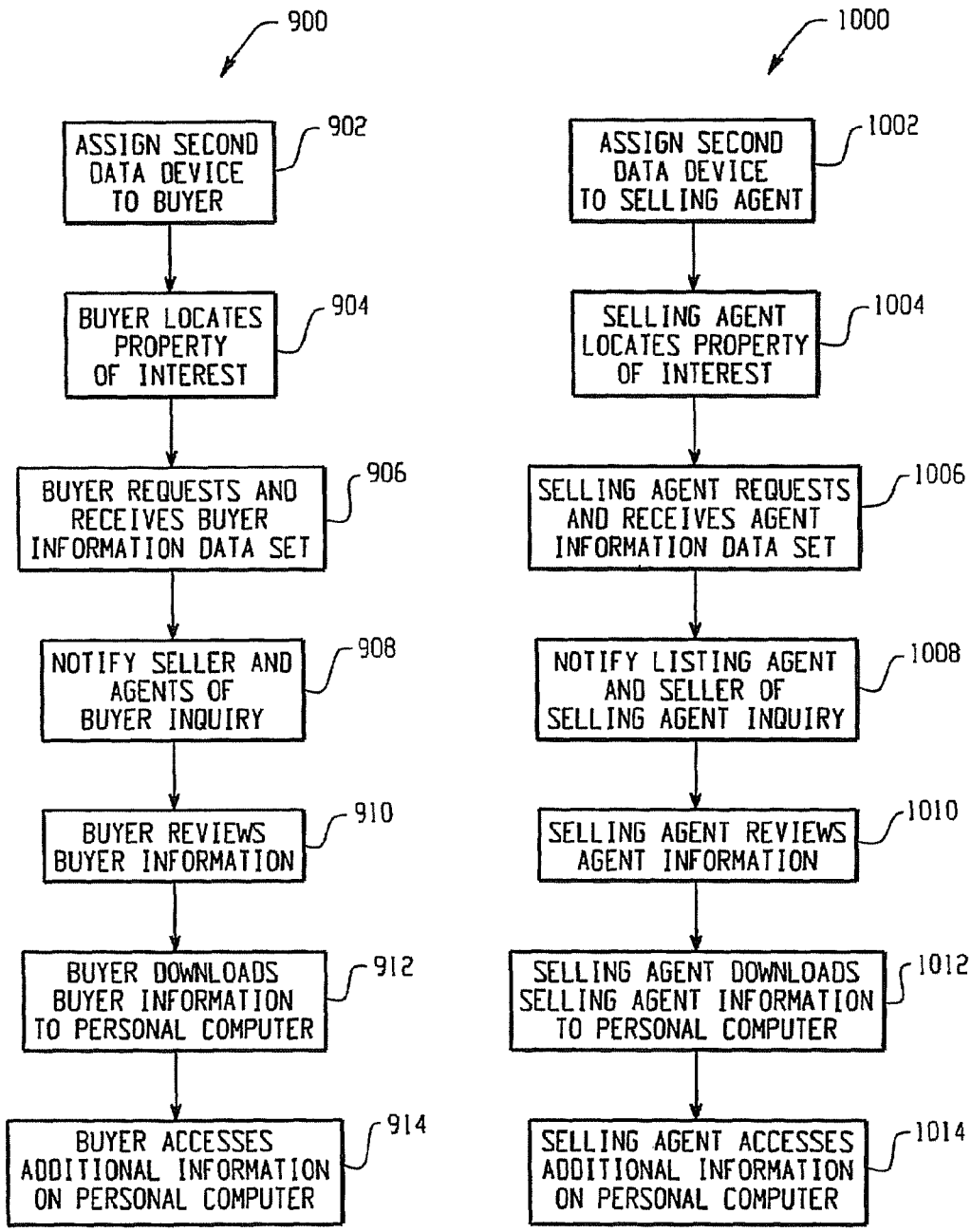

SYSTEM AND METHOD FOR DISTRIBUTING INFORMATION

CROSS REFERENCE TO RELATED APPLICATIONS

This application is a continuation of U.S. patent application Ser. No. 10/133,731 filed Apr. 26, 2002, the contents of which are incorporated by reference herein in their entirety.

BACKGROUND

1. Field of the Invention

The invention relates to a system and method for distributing information, and more particularly to a system and method for the distribution of marketing information related to an asset and parties interested in the asset.

2. Description of the Related Art

Potential buyers of assets often desire market information about the asset before purchasing the asset. In a real estate market, for example, a seller of property will list the property for sale through a real estate listing. The listing agent prepares marketing information about the property and lists the property by inputting the marketing information into a Multiple Listing Service (MLS) database. Once the property is listed, the selling agent places a "for sale" sign on the property. The sign often has a compartment that contains information sheets detailing selected market information about the property. A party interested in the property, such as a potential buyer or an agent of the potential buyer, often tales one of the information sheets to learn more about the property. After reviewing the information sheet, the interested party will contact the selling agent to schedule an appointment to view the property.

However, information sheets are not always available to the interested party, as the sheets are often all taken from the sign compartment before being replenished by the selling agent. Furthermore, the selling agent does not know which interested parties have taken information sheets, or when the information sheets were taken.

While systems that provide traffic data or utility data from a stationary transmitter to a nearby mobile receiver do exist, and systems including wireless in-car telematic devices that communicate with special broadband wireless stations also exist, those systems do not facilitate the marketing of real estate or other assets as detailed in the following description. Furthermore, those systems do not facilitate the distribution of marketing information related to the assets and the interested parties.

SUMMARY

In accordance with the invention, a system for marketing real estate includes a property data device and a personal data device. The property data device is to be located in the vicinity of a real estate property, and includes a first storage device for storing property information data related to the real estate property, and a first communication subsystem having a transmitter. The property data device is operable to transmit the property information data.

The personal data device is to be provided to a user, and includes a second storage device for storing data, and a second communication subsystem having a receiver. The personal data device is operable to receive the property information data transmitted by the property data device, and store the property information data in the second storage device.

Also in accordance with the invention, a method of marketing a real estate property uses a property data device and a personal data device. The property data device is located in the vicinity of the real estate property, and property information data related to the real estate property is stored in the property data device. A personal data device is provided to a user. The property data device is operable to transmit the property information data, and the personal data device is operable to receive and store the property information data transmitted by the property data device.

BRIEF DESCRIPTION OF THE DRAWINGS

FIG. 9 is a flow diagram illustrating a method of providing property information to a prospective buyer;

FIG. 10 is a flow diagram illustrating a method of providing property information to a selling agent;

DETAILED DESCRIPTION

Figure 1:
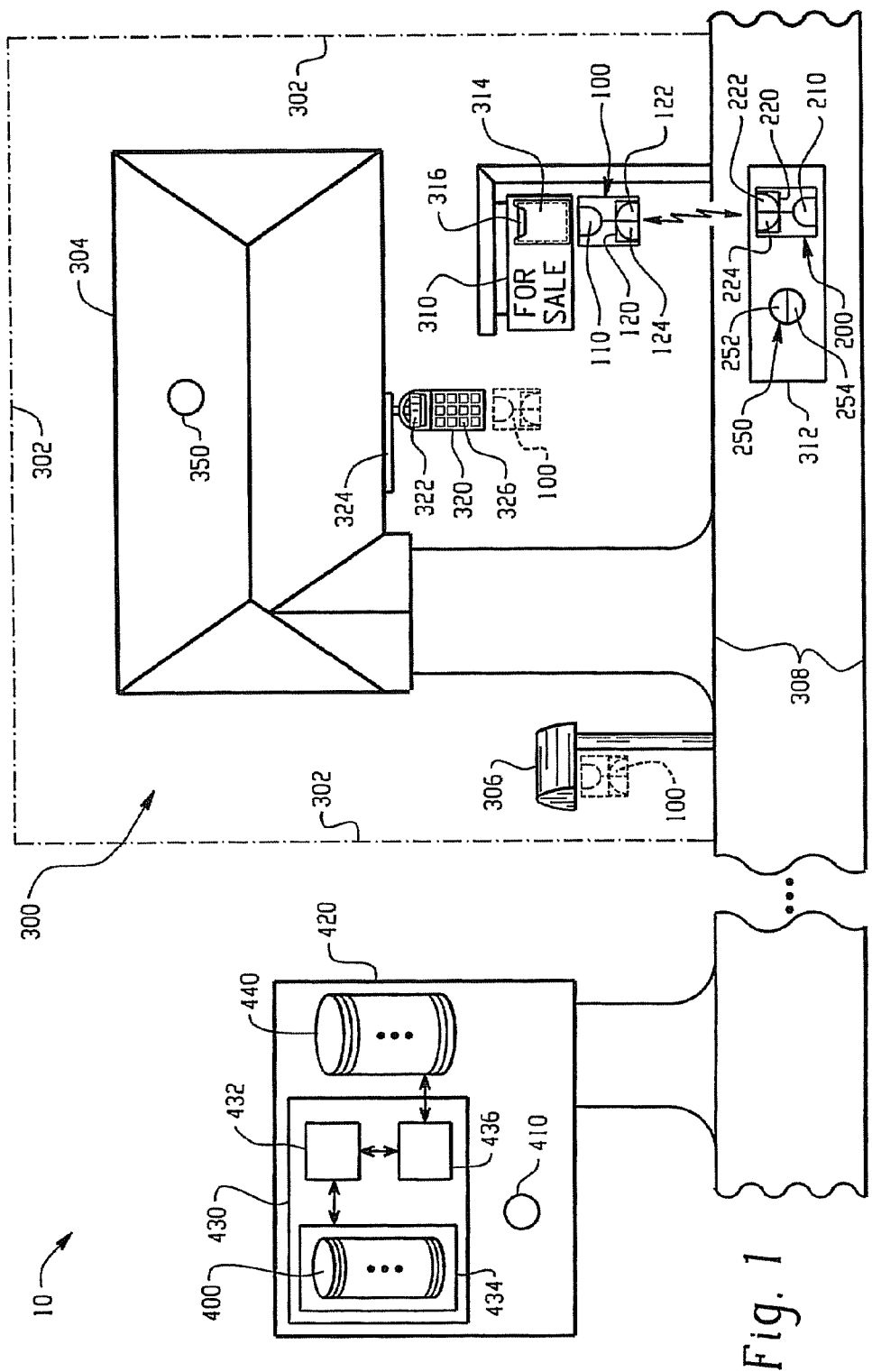
FIG. 1 is a schematic view of a real estate property offered for sale through a real estate office.

An illustrative system 10 for distributing market information related to a real estate property is shown with reference to FIG. 1. The system 10 electronically provides market information related to a real estate property to an interested party.

The illustrative system 10 includes a first data device 100 that includes a first storage device 110 and a first communication subsystem 120 having a transmitter 122, and a second data device 200 that includes a second storage device 210 and a second communication subsystem 220 having a receiver 224. The first data device 100 is located in the vicinity of a property 300 that is for sale. Property information related to the property 300 is stored in the first storage device 110, and the transmitter 122 of the first communication subsystem 120 transmits the property information. The second data device 200 is provided to a user 250, and is operable to receive the property information transmitted by the first data device 100, and store the property information in the second storage device 210. Thus, the property information is provided to the user 250 upon the second data device 200 receiving the property information transmitted from the first data device 100.

In addition to providing the user 250 with property information, the system 10 is further operable to receive information from the user 250, such as a request to receive the property information stored in first data device 100. Thus, in another illustrative embodiment, the second communication subsystem 220 includes a transmitter 222, and is operable to transmit request data. The first communication subsystem 120 includes a receiver 124, and is operable to receive the request data and transmit the property information data in response. Thus, the property information is provided to the user 250 at the user's request.

Additionally, the request data includes identification data related to the user, and this identification data is stored in the first data device 100. The first data device 100 is also operable to generate and transmit a property data set based on the identification data. Thus, depending on the identification data received, different property data sets may be provided to the user 250.

The identification data and property information data is further stored in an information database 400, which is used to generate market related reports from the stored identification data and the property information data. The market related reports include the number of user inquiries regarding the property 300, the number of appointments requested and scheduled to view the property 300 and other market related information.

The real estate market for which the system 10 facilitates the distribution of market information as detailed above is described with reference to FIG. 1. The property 300 is illustratively a unit of real estate defined by boundaries 302 and includes a house 304 and mailbox 306. The property 300 is adjacent a street 308, and has a "for sale" sign 310 located near the street 308 to attract the interest of the user 250 driving by in an automobile 312. The "for sale" sign 310 includes a compartment 314 containing several information sheets 316 that contain market information related to the property 300 and the house 304. A key box 320 is placed on the doorknob 322 of a door 324 to the house 304. The key box 320 is a small, locked receptacle for holding a key to the door 324, and is unlocked by inputting a numeric code via a numeric keypad 326 on the key box 320.

A seller 350 owns the property 300, and has listed the property 300 through a listing agent 410 working out of an office 420. The listing agent 410 has a computer 430 comprising a processor 432, a memory device 434, and a communication device 436, through which the listing agent 410 has access to a Multiple Listing Service (MLS) database 440. The MLS database 440 associates information related to the property 300 with a MLS number key. Property information stored in the MLS database 440 illustratively includes the price of the house; the house address; the age of the house; the number and type of rooms in the house; the square of footage of the house; comparable prices for other houses in the surrounding area; contact information; and an Internet address for photographs of the house and property and property information. Of course, other information can also be included in the MLS database.

Property information related to the property 300 is stored in the first storage device 110 of the first data device 100. The property information may include information from the MLS database 440 described above, and may also include other information in addition to the information from the MLS database 440. The first data device 100 is affixed to the "for sale" sign 310, as shown in FIG. 1. Alternatively, the first data device 100 is affixed to the mail box 306 or the key box 320, as indicated by the phantom locations of the first data device 100 in FIG. 1. Additionally, the first data device 100 can be affixed to other locations on or in the vicinity of the property 300.

When interested in purchasing real estate, a prospective buyer 252 typically contacts a selling agent 254, who then represents the prospective buyer 252. The selling agent 254 and the buyer 252 contact the listing agent 410, who then provides the potential buyer 252 and the selling agent 254 with a second data device 200. Thus it is to be understood that the user 250 may be the potential buyer 252, or the selling agent 254. Of course, the user 250 may already be in possession of a second data device 200, and thus the listing agent 410 does not need to provide the user 250 with a second data device.

The second data device 200 can include identification data to identify the user 250 with which it is associated, e.g. either the buyer 252 or selling agent 254. The identification data can be specified to identify the user only as a buyer 252 or selling agent 254, or can be specified to identify the user as a particular selling agent 254, or as a particular buyer 252.

Figure 2:
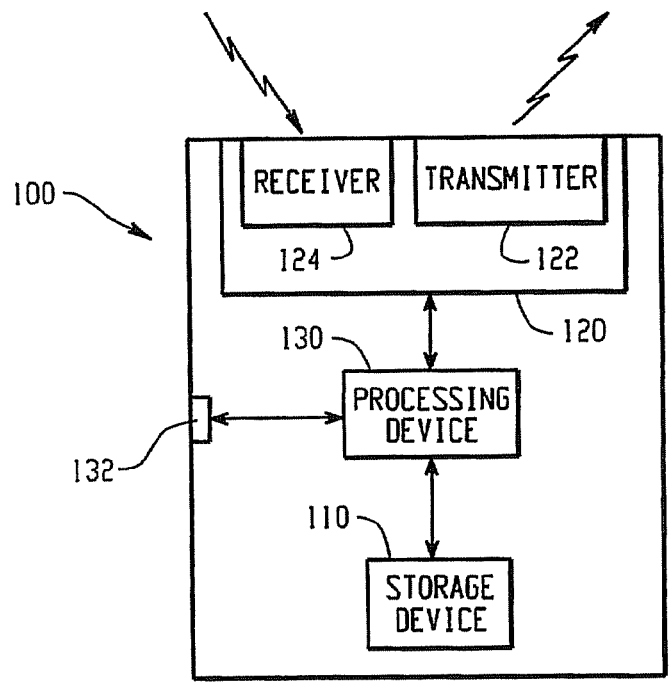
FIG. 2 is a block diagram of an illustrative embodiment of a first data device.
Figure 3:
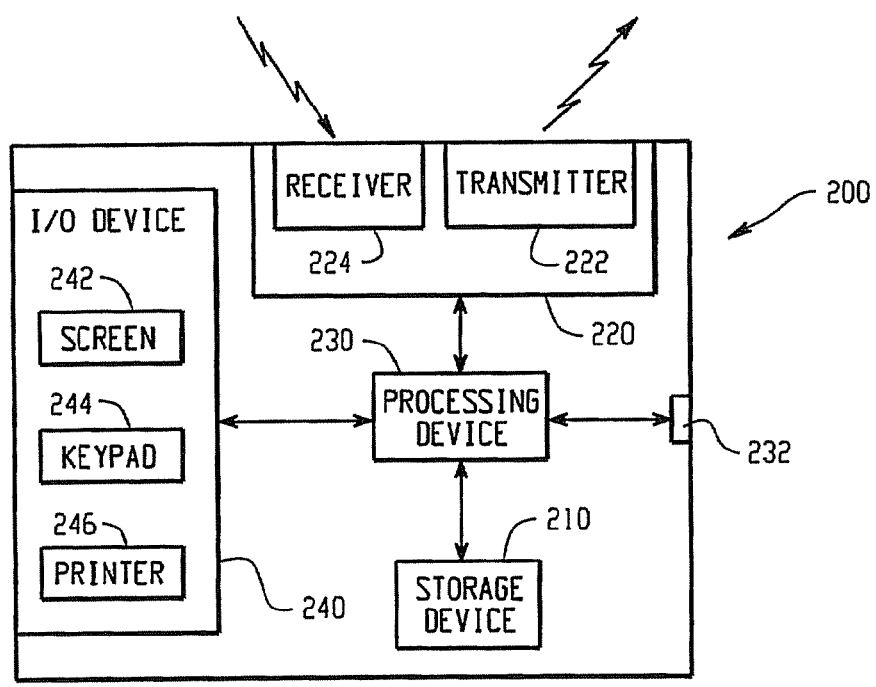
FIG. 3 is a block diagram of an illustrative embodiment of a second data device.

Shown in FIGS. 2 and 3, respectively, are illustrative embodiments of the first data device 100 and the second data device 200. Referring now to FIG. 2, the first data device 100 includes a first storage device 110 for storing property information related to the property 300. The first storage device 110 is an electronic device that provides for the electronic storage and retrieval of data, such as Random Access Memory (RAM), magnetic disk media, and other such devices.

A first communication subsystem 120 includes a first transmitter 122 that is operable to transmit data stored in the first storage device 110. The first communication subsystem also comprises a first receiver 124 that is operable to receive transmitted data. Data transmission and reception for the communication subsystem 120 can conform to known standards, such as IEEE 802.11b, cellular communication standards, or other known standards, or can be carried out according to a proprietary transmission scheme. Of course, a single transceiver unit may be used in place of the first transmitter 122 and the first receiver 124.

A first processing device 130 is coupled to the first communication subsystem 120 and first storage device 110. The first processing device 130 is programmed to receive data from the first communication subsystem 120, access the first storage device 110 to store and retrieve data, and to instruct the first communication subsystem 120 to transmit data. The first processing device 130 is a programmable microprocessor or controller, or an application specific integrated circuit, or other configurable processing device.

The first processing device 130 is also connected to a first communication port 132. The first communication port 132 is used to establish a direct link via a cable with another processing device. Communication over the first communication port 132 can conform to a known standard, such as RS-232, or can be carried out according to a proprietary communication scheme.

Referring now to FIG. 3, the second data device 200 includes a second storage device 210 for storing property information related to the property 300 received from the first communication device 100. The second storage device 210 is an electronic device that provides for the electronic storage and retrieval of data, such as Random Access Memory (RAM), magnetic disk media, and other such devices.

A second communication subsystem 220 includes a second receiver 224 that is operable to receive transmitted data. The second communication subsystem 220 also comprises a second transmitter 222 that is operable to transmit data stored in the second storage device 210. Data transmission and reception for the second communication subsystem 220 can conform to known standards, such as IEEE 802.11b, cellular communication standards, or other known standards, or can be carried out according to a proprietary transmission scheme. Of course, a single transceiver unit may be used in place of the second transmitter 222 and the second receiver 224.

An input/output device 240 provides an input/output interface to the user 250. The input/output device can include a display screen 242, a keypad 244, and a printer 246. Through use of the input/output device 240, the user 250 reviews property information received from the first data device 100, and inputs requests for receiving data and scheduling appointments. The display screen 242 and the keypad 244 may be combined into a touch sensitive display.

A second processing device 230 is coupled to the storage device 210, the second communication subsystem 220, and the input/output device 240. The second processing device 230 is programmed to receive data from the second communication subsystem 220, access the second storage device 210 to store and retrieve data, and to instruct the second communication subsystem 220 to transmit data. The second processing device 230 is a programmable microprocessor or controller, or an application specific integrated circuit, or other configurable processing device.

The second processing device 230 is also connected to a second communication port 232. The second communication port 232 is used to establish a direct link with another processing device. Communication over the second communication port 232 can conform to a known standard, such as RS-232, or can be carried out according to a proprietary communication scheme.

The storage device 210 further includes identification data associating the second data device 200 with a buyer 252 or selling agent 254. Thus, the identification data identifies the user associated with the second data device 200 as either the buyer 252 or selling agent 254. Alternatively, the second processing device 230 can be operable to include the identification data to associate the second data device 200 with a buyer 252 or selling agent 254.

The first and second data devices 100 and 200 are implemented using programmable devices, such as a Personal Digital Assistant (PDA), a hand held PC, or other programmable devices. Alternatively, the first and second data devices 100 and 200 are implemented using an application specific hardware design and programming.

Figure 4:
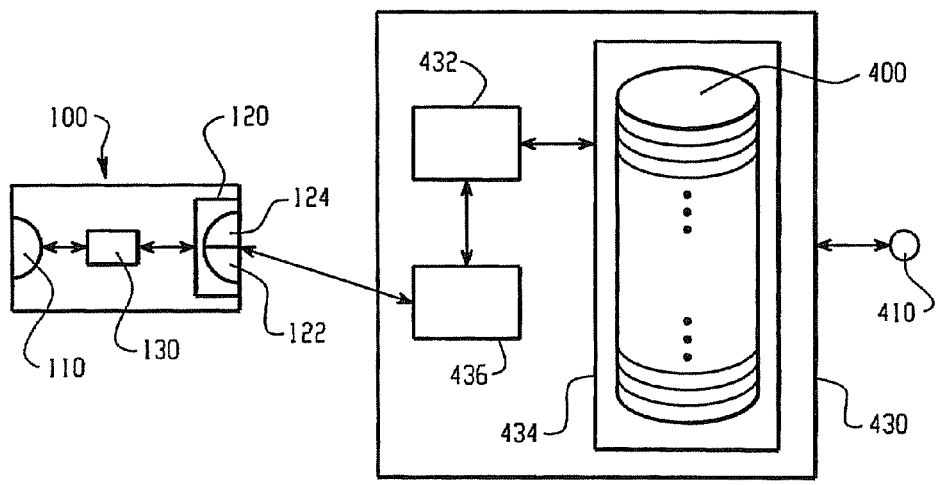
FIG. 4 is a block diagram of a computer including a database for storing information received from the first data device.

The information database 400 stored in computer 430 stores information related to the buyer 252, the selling agent 254, the property 300, the seller 350, and listing agent 410. The computer 430 is operable to communicate with the first data device 100 to receive and store the information stored in the first storage device 110 of the first data device 100. As shown in FIG. 4, data is transmitted from the first communication subsystem 120 of first data device 100 to the communication device 436 of the computer 430. This information illustratively includes information requests received by the first data device 100, identification data related to users requesting information from the first data device 100, and appointment requests requested by users.

The processor 432 is programmed to access the information database 400 and generate activity reports detailing activity related to the information requests received from the data device 100. The listing agent 410 arranges for these reports to be generated on a periodic basis, e.g. daily, weekly, or monthly. The listing agent 410 and the seller 350 assess user interest in the property 300 from these reports. These reports may be arranged so that the seller 350 may have access to report summaries related to the property 300 over the Internet, while the listing agent 410 has access to fully detailed reports related to the property 300 and other properties. Fully detailed reports may included a list of users 250 interested in the property 300, other comparable properties for which the users 250 have requested information, a list of all properties a particular user 250 has viewed, etc.

Figure 5A:
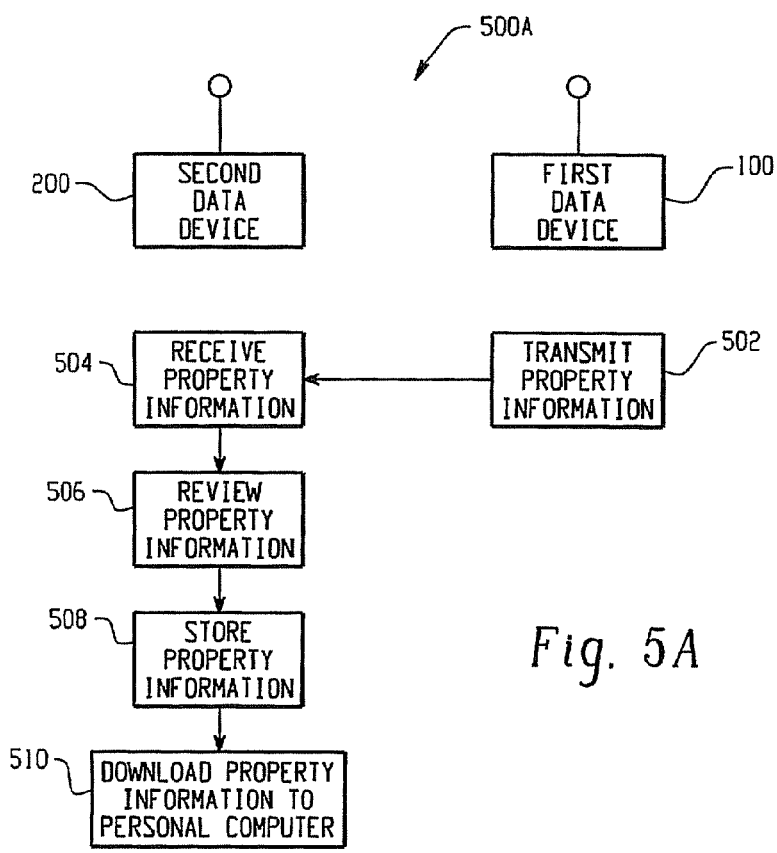
FIG. 5A is a flow diagram illustrating the transmission of information related to the property from the first data device to the second data device.

Operation of the illustrative system 10 is described with reference to FIGS. 5A-10. Referring in particular to FIG. 5A, flow diagram 500A illustrates the transmission of property information from the first data device 100 to the second data device 200. As described above, the first data device 100 is operable to transmit property information data that is received by the second data device 200. Typically, a user 250 is in possession of the second data device 200, e.g., the second data device is on the user's 250 person or mounted in an automobile. The first data device 100 is located in the vicinity of the property 300 and transmits property information related to the property 300, as shown in step 502. When the user 250 is in the transmission range of the first data device 100, the second data device 200 receives property information data transmitted from the first data device 100, as shown in step 504. Through use of the input/output device 240, the user 250 reviews the property information received, as shown in step 506. In step 508, the property information is stored in the second storage device 210 of the second data is device 200.

The second data device 200 is further operable to transfer the property information data stored in the second storage device 210 to a personal computer via the second communication subsystem 220 or a direct link via the communication port 232. Accordingly, property information stored in the second storage device 210 of the second data device 200 is downloaded to the personal computer for later review, as shown in step 510.

Figure 5B:
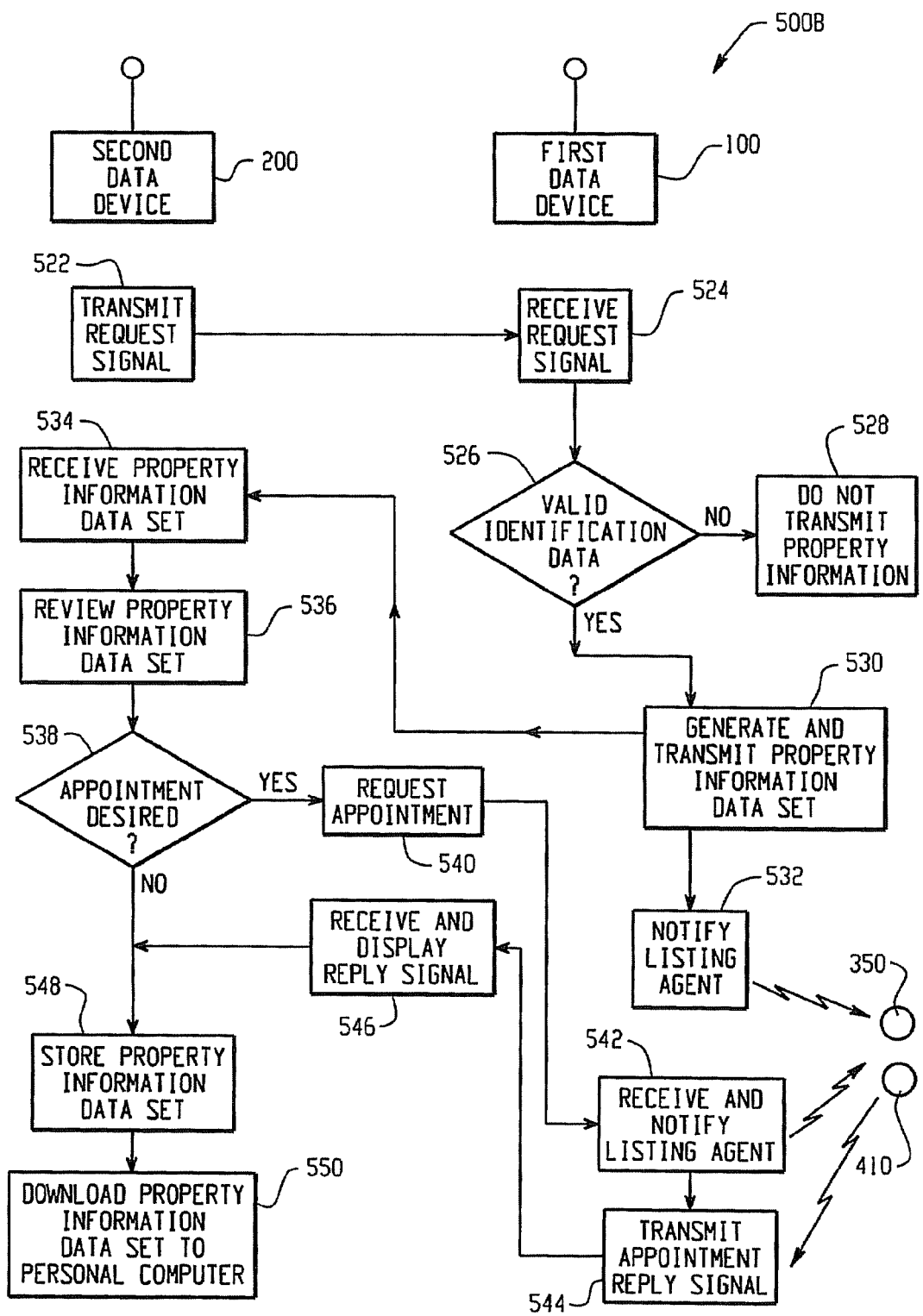
FIG. 5B is a flow diagram illustrating an exchange of information relating to the property between the first and second data devices.

In another illustrative embodiment, the first data device 100 is operable to transmit property information data in response to a request signal transmitted by the second data device 200. The first data device 100 is further operable to receive identification data included in the request signal and generate property information data sets based on the identification data. Referring now to FIG. 5B, flow diagram 500B illustrates an exchange of information relating to the property 300 between the first and second data devices 100, 200 in response to a request signal. Typically, the user 250 is in possession of the second data device 200. When the user 250 is in the transmission range of the first data device 100, the user 250 actuates the second data device to send a request signal to the first data device 100, as shown in step 522. The user actuates the second data device to send the request signal through use of the input/output device 240.

The first data device 100 receives the request signal transmitted by the second data device 200, as shown in step 524. In step 526, the first data device 100 determines if the identification data in the request signal is valid. If the identification data is not valid, no information is transmitted, as shown in step 528. If the identification data is valid, however, a property information data set for the property 300 is generated and transmitted from the first data device 100 to the second data device 200, as shown in step 530.

After the property information data set is transmitted in step 530, the listing agent 410 is notified that the user 250 requested property information for the property 300, as shown in step 532. Through these notifications the listing agent 410 can determine the frequency of information requests for the property 300, including identification indicia of the users 250 who have requested property information, and the date and time of the requests. The listing agent 410 is notified by the communication subsystem 120 of the first data device 100 sending the information received from the second data device 200 to the computer 430. The information received at the computer 430 is stored in the information database 400.

Upon transmission of the property information data set from the first data device 100, the second data device 200 receives the property information data set, as shown in step 534. Through the input/output device 240, the user 250 reviews the property information data set received, as shown in step 536.

In step 538, the user 250 decides whether to request an appointment to further inspect the property 300. If an appointment is desired, the user requests an appointment via the input/output device 240 in step 540.

Upon receiving the appointment request signal, the first communication subsystem 120 of the first data device 100 transmits a notification to the computer 430 and the requested appointment time is displayed on the computer 430. The listing agent 410 may accept or reject the appointment, or may contact the seller 350 and the seller 350 may then accept or reject the appointment. Alternatively, the notification is sent to a cell phone, pager, PDA, or other wireless communication device associated with the listing agent 410 and operable to display the appointment request, receive indicia of an acceptance or rejection input from the listing agent 410, and transmit an appointment reply signal back to the first data device 100. The appointment reply signal includes data indicating whether the listing agent 410 accepted or rejected the appointment request.

The appointment reply signal is transmitted from the first data device 100 to the second data device 200, as shown in step 544. Alternatively, the appointment reply signal is transmitted directly from the wireless device to the second data device 200. Upon receipt of the appointment reply signal in step 546, the user 250 will be informed via the input/output device 240 whether the requested appointment has been accepted.

In step 548, the property information data set and appointment data are stored in the second storage device 210 of the second data device 200. The second data device 200 is further operable to transfer the property information data set stored in the second storage device 210 to a personal computer via the second communication subsystem 220 or a direct link via the communication port 232. Accordingly, the property information data set stored in the second storage device 210 of the second data device 200 is downloaded to the personal computer for later review, as shown in step 550.

Figure 6:
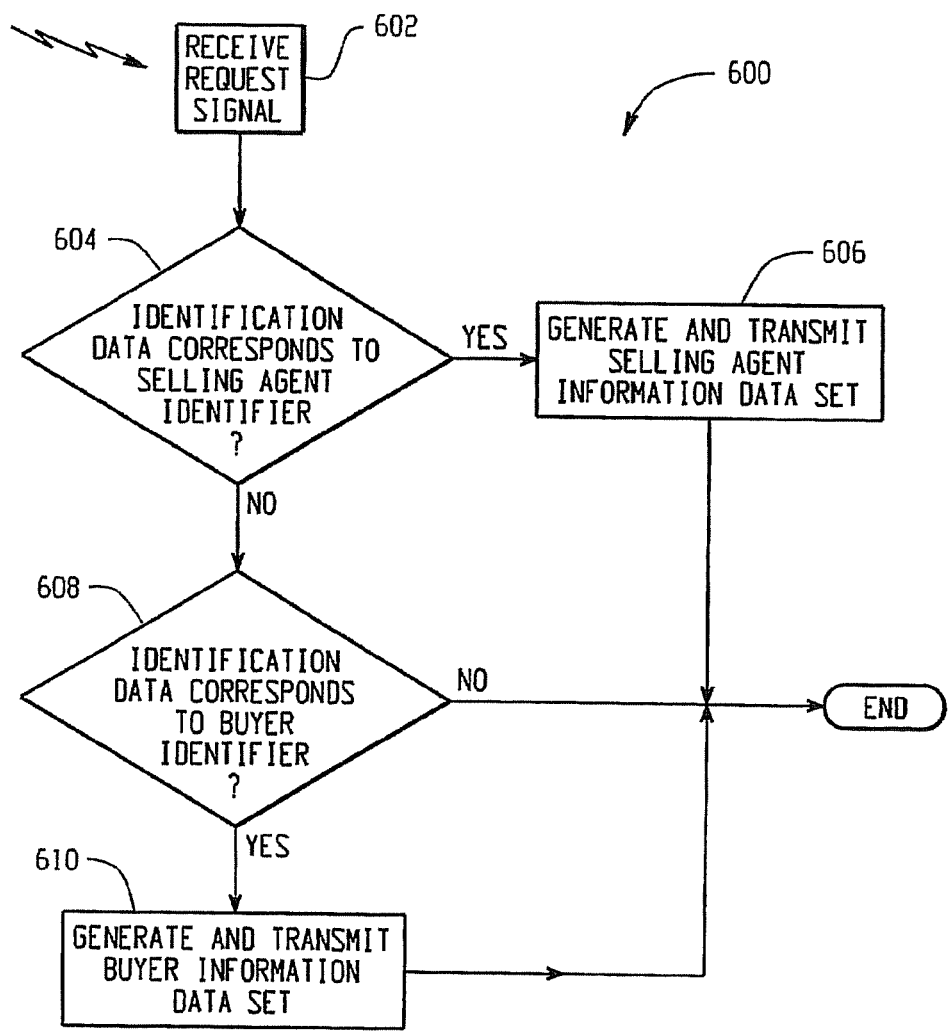
FIG. 6 is a flow diagram illustrating the generation of a data set based on identification data.

The generation of a property information data set in response to the identification data included in a request signal is illustrated with reference to the identification process of flow diagram 600 of FIG. 6. The identification process enables the first data device 100 to provide different property information data sets based on the identification data received from the second data device 200. In step 602, the first data device 100 receives the transmitted request signal from the second data device 200. The request signal comprises identification data that identifies whether the second data device 200 is associated with a buyer 252 or selling agent 254. Illustratively, the identification data corresponds to a selling agent identifier or a buyer identifier. If the identification data corresponds to the selling agent identifier, a selling agent information data set is transmitted in response to the information request signal. If the identification data corresponds to the buyer identifier, then a buyer information data set is transmitted in response to the information request signal. Typically, the buyer information data set is a subset of the selling agent information data set.

In step 604, the first data device 100 determines whether the identification data corresponds to the selling agent identifier. If the identification data corresponds to the selling agent identifier, the selling agent information data set is transmitted in step 606. If the identification data does not correspond to the selling agent identifier, then the first data device 100 determines whether the identification data corresponds to the buyer identifier, as shown in step 608. If the identification corresponds to the buyer identifier, then the buyer information data set is transmitted in step 610. If not, no information is transmitted.

Several alternative embodiments for requesting and scheduling appointments are illustrated with reference to FIGS. 7A and 7B. An appointment request includes a date and time, and is described with reference to FIG. 7A below. Alternatively, an appointment request includes a request for available appointment times, and is described with reference to FIG. 7B below.

Figure 7A:
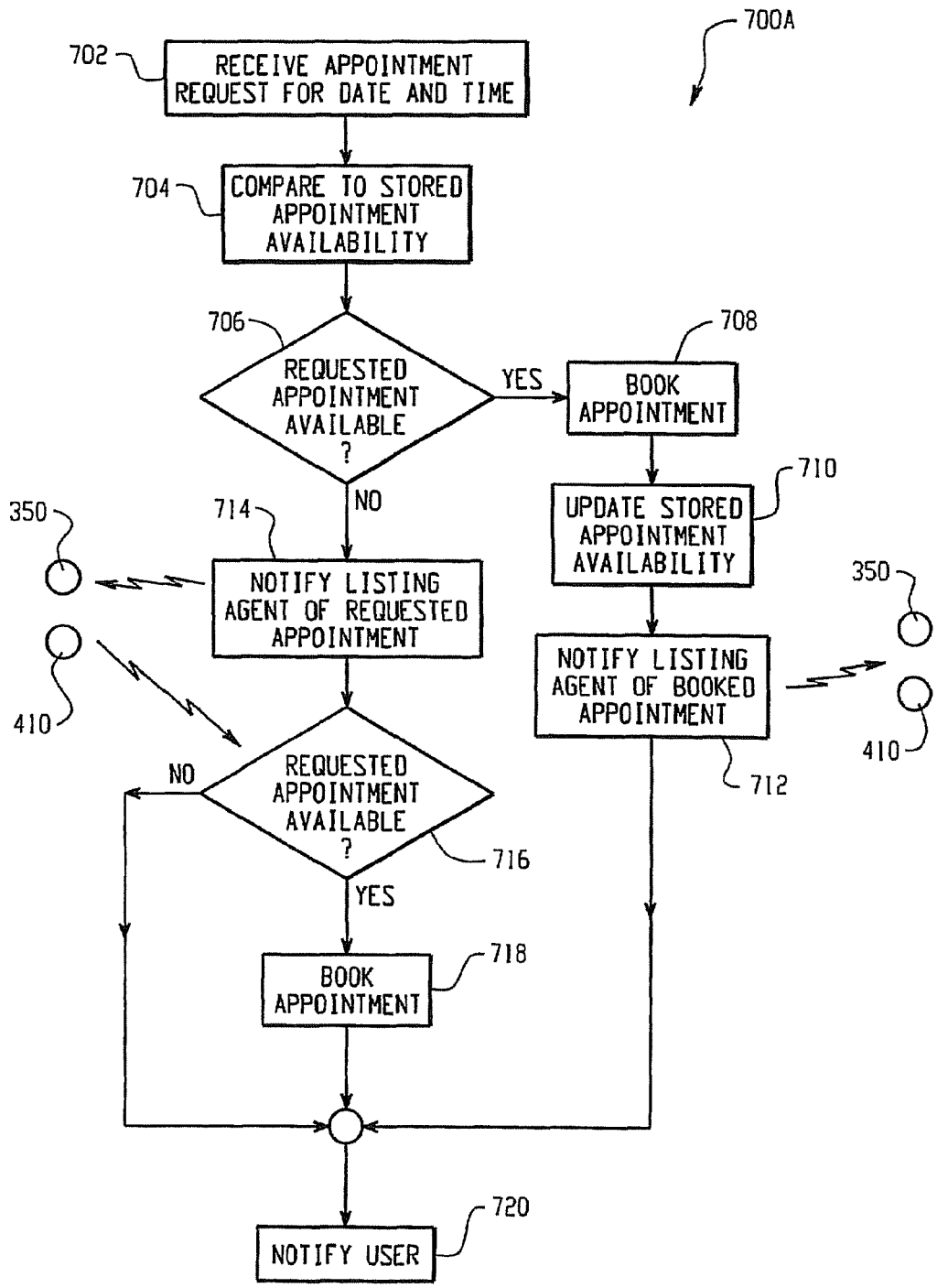
FIG. 7A is a flow diagram illustrating the process of scheduling and confirming a requested appointment.

Referring to FIG. 7A, flow diagram 700A illustrates a process of scheduling and confirming a requested appointment for a particular time and day. The first data device 100 receives the requested appointment time in step 702, and compares the requested appointment time to stored appointment availability in step 704. Appointment availability includes blocks of time that the seller 350 or listing agent 410 has indicated the property 300 is available for inspection by a user 250. The stored appointment availability is stored in the first storage device 110. Alternatively, the stored appointment availability is stored in the memory device 434 of the computer 430. If the requested appointment is available as determined in step 706, the appointment is booked in step 708. The stored appointment availability is updated in step 710 to preclude a second appointment being scheduled during the same time. The listing agent 410 is then notified in step 712.

If the requested appointment does not fall within the current appointment availability, and is therefore not available, the listing agent 410 is notified of the requested appointment in step 714. The listing agent 410 may then decide whether to accept or reject the appointment, or may contact the seller 350. Thus, in step 716, the seller 350 and/or listing agent 410 determine whether the property 300 will be available for the requested appointment. If the seller 350 and/or listing agent 410 agree to the proposed appointment, the appointment is accepted and booked in step 718. If the seller 350 and/or listing agent 410 do not agree to the proposed appointment, the appointment is rejected. In step 720, the user 250 is notified as to whether the requested appointment is accepted or rejected. This notification is transmitted from the first data device 100 to the second data device 200. Alternatively, the notification is provided by other means, such as e-mail, or by the seller 350 and/or listing agent 410 directly contacting the user 250, in the event that the seller 350 and/or listing agent 410 cannot be immediately contacted in step 714.

In an alternative embodiment, the user 250 can choose an appointment from an appointment availability list instead of requesting a specific time and date for an appointment. Flow diagram 700B of FIG. 7B illustrates the process of scheduling and confirming an appointment in response to an appointment request. In step 730, the first data device 100 receives an appointment request from the second data device 200. In step 732, the first data device 100 provides the appointment availability to the second data device 200. If the user 250 decides on an appointment time in step 734, the user 250 specifies the available date and time for an appointment. The appointment date and time are transmitted from the second data device 200 to the first data device 100, and the appointment availability is updated in step 736. Finally, in step 738, the listing agent 410 is notified of the booked appointment.

Figure 7B:
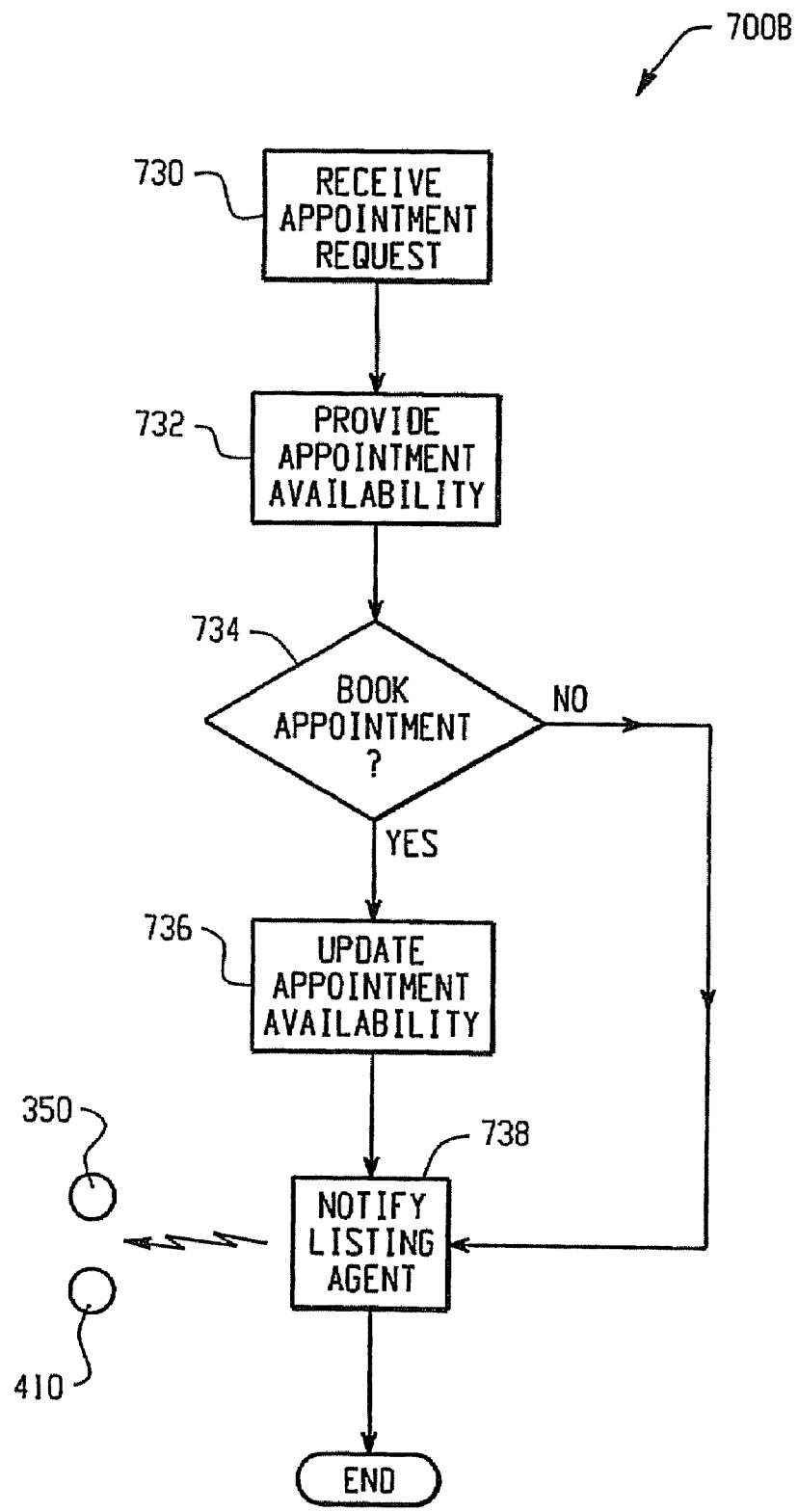
FIG. 7B is a flow diagram illustrating the process of scheduling and confirming an appointment in response to an appointment request.

While the flow diagrams of FIGS. 7A and 7B illustrate that the listing agent 410 is notified of requested appointments, alternative embodiments include notifying both the listing agent 410 and the seller 350, or only the seller 350. Notification is sent by e-mail to a seller's e-mail address, by instant messaging, or to a wireless communication device associated with the seller.

Figure 8A:
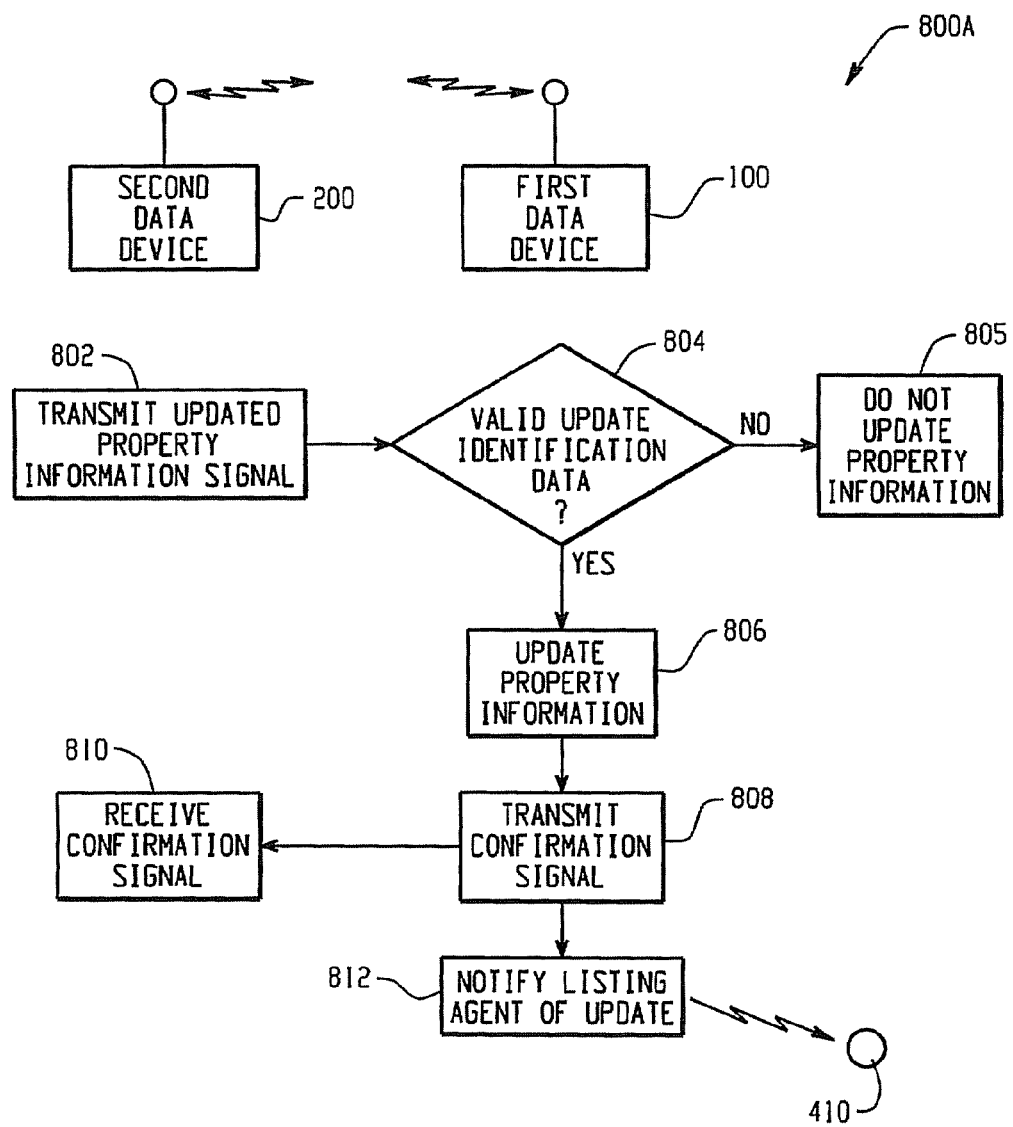
FIG. 8A is a flow diagram illustrating the process of using the second data device to update asset information stored in the first data device.

Property information for the property 300 may need to be updated periodically. For example, updates may reflect a change in the asking price of the property 300, or may reflect a pending offer on the property 300, or may reflect that the property 300 is sold. Referring to FIG. 8A, flow diagram 800A illustrates the process of using the second data device 200 to update the information stored in the first data device 100. In step 802, the second data device 200 transmits an updated property information signal to the first data device 100.

As the ability to update information stored in the first data device 100 is preferably restricted, update identification data is provided in the property information update signal to establish that the user 250 is authorized to update the data. In step 804, the first data device 100 determines whether the update identification data included in the property information update signal received is valid. If the update identification data is not valid, the corresponding property information is not updated, as shown in step 805. However, if the update identification data is valid, the corresponding property information is updated in step 806 by storing the updated property information data in the first storage device 110. In step 808 a confirmation signal confirming the update is transmitted to the second data device 200. Upon receipt of the confirmation signal in step 810, the second data device 200 notifies the user 250 that the first data device 100 has been updated with updated property information. The first data device 100 then notifies the listing agent 410 of the property information update, as shown in step 812.

Figure 8B:
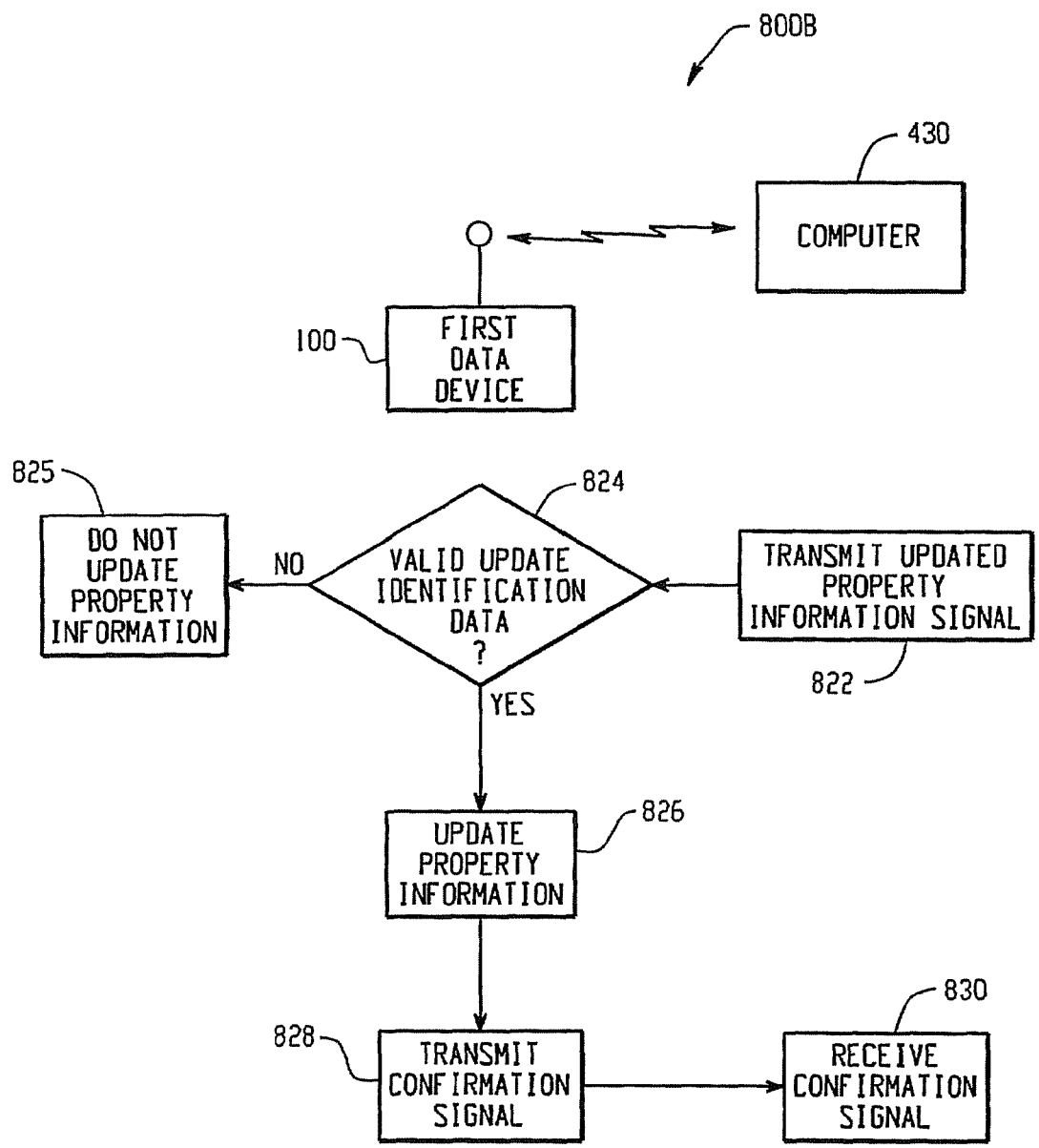
FIG. 8B is a flow diagram illustrating the process of using the computer to update asset information stored in the first data device.

Another method of updating the first data device 100 is provided in flow diagram 800B of FIG. 8B. The computer 430 is configured to update the information in the first data device 100, and thus the update is done from a central location. In step 822, the computer 430 transmits an updated property information signal to the first data device 100. The first data device 100 receives the update identification data included in the property information update signal and determines whether the update identification data is valid, as shown in step 824. If the update identification data is not valid, the corresponding property information is not updated, as shown in step 825. However, if the update identification data is valid, then the corresponding property information is updated in step 826 by storing the updated property information data in the first storage device 110. In step 828 a confirmation signal is sent to the computer 430. Upon receipt of the confirmation signal by the computer 430 in step 830, the property information update is complete.

The update procedure of FIG. 8A is implemented using the first and second communication subsystems 120 and 220 to establish communication between the first and second data devices 100 and 200, or, alternatively, by using the first and second communication ports 132 and 232 to establish communication between the first and second data devices 100 and 200. Similarly, the updating procedure of FIG. 8B is implemented by using the first communication subsystem 120 or the first communication port 132 of the first data device to establish communication with the computer 430.

The information exchange system 10 also facilitates novel methods of providing property information to buyers 252 and selling agents 254, as shown and described in FIGS. 9 and 10, respectively. Referring to FIG. 9, the flow diagram 900 illustrates a method of providing a buyer information data set to a prospective buyer 252. In step 902 the listing agent 410 assigns a second data device 200 to the buyer 252. The second data device 200 includes identifier data identifying the second data device 200 as being associated with the buyer 252. The buyer 252 visits various properties, and locates a property of interest in step 904. The buyer 252 then requests and receives a buyer information data set, as shown in step 906 and as previously illustrated with reference to FIGS. 5B and 6 above.

In step 908, the seller 350, listing agent 410 and selling agent 254 are notified of the buyer's 252 request for information. Thus, the seller 350 and listing agent 410 are apprised of the status of the property 300, and the selling agent 254 is kept aware of the buyer's 252 inquiries.

In step 910, the buyer 252 reviews the buyer information provided in step 906. The buyer information is initially reviewed via the input/output device 240 of the second data device 200, allowing the buyer 252 to determine whether further inquiries regarding the property 300 are warranted. If the buyer 252 desires further information on the property 300, the buyer downloads the buyer information to a personal computer, as shown in step 912. From the personal computer, the buyer 252 accesses additional information relating to the buyer information received in step 914, e.g., pictures of the house 304 on the property 300; a virtual tour of the house 304 on the property 300; etc. The additional information is illustratively accessed by the personal computer through a network, such as the Internet.

Referring now to FIG. 10, flow diagram 1000 illustrates a method of providing an agent information data set to a selling agent 254. In step 1002, the listing agent 410 assigns a second data device 200 to the selling agent 254. The second data device 200 includes identifier data identifying the second data device 200 as being associated with the selling agent 254. The selling agent 254 visits various properties, and locates a property of interest in step 1004. The selling agent 254 then requests and receives a selling agent information data set, as shown in step 1006 and as previously illustrated with reference to FIGS. 5B and 6 above.

In step 1008, the seller 350 and listing agent 410 are notified of the selling agent's 410 request for information. Thus, the seller 350 and listing agent 410 are apprised of the status of the property 300, and of the interest of the selling agent 254.

In step 1010, the selling agent 254 reviews the selling agent information provided in step 1006. The selling information is initially reviewed via the input/output device 240 of the second data device 200, allowing the selling agent 254 to determine whether further inquiries regarding the property 300 are warranted. If the selling agent 254 desires further information on the property 300, the selling agent 254 downloads the selling agent information to a personal computer, as shown in step 1012. From the personal computer, the selling agent 254 accesses additional information relating to the selling agent information received in step 1014 e.g., pictures of the house 304 on the property 300; a virtual tour of the house 304; etc. The additional information is illustratively accessed by the personal computer through a network, such as the Internet.

In another illustrative embodiment of the invention, the input/output device 240 of the second data device 200 of FIG. 3 includes a printer 246. After the second data device 200 receives property information related to the property 300, the user 250 uses the input/output device 240 to print the information sheets 316 that are normally deposited in the compartment 314 of the "for sale" sign 310. Thus, in the event of inclement weather, or if the user 250 cannot readily reach the "for sale" sign 310, or if the information sheets 316 are depleted, the user 250 can readily print the information sheet 316 using the second data device 200.

Figure 11A:
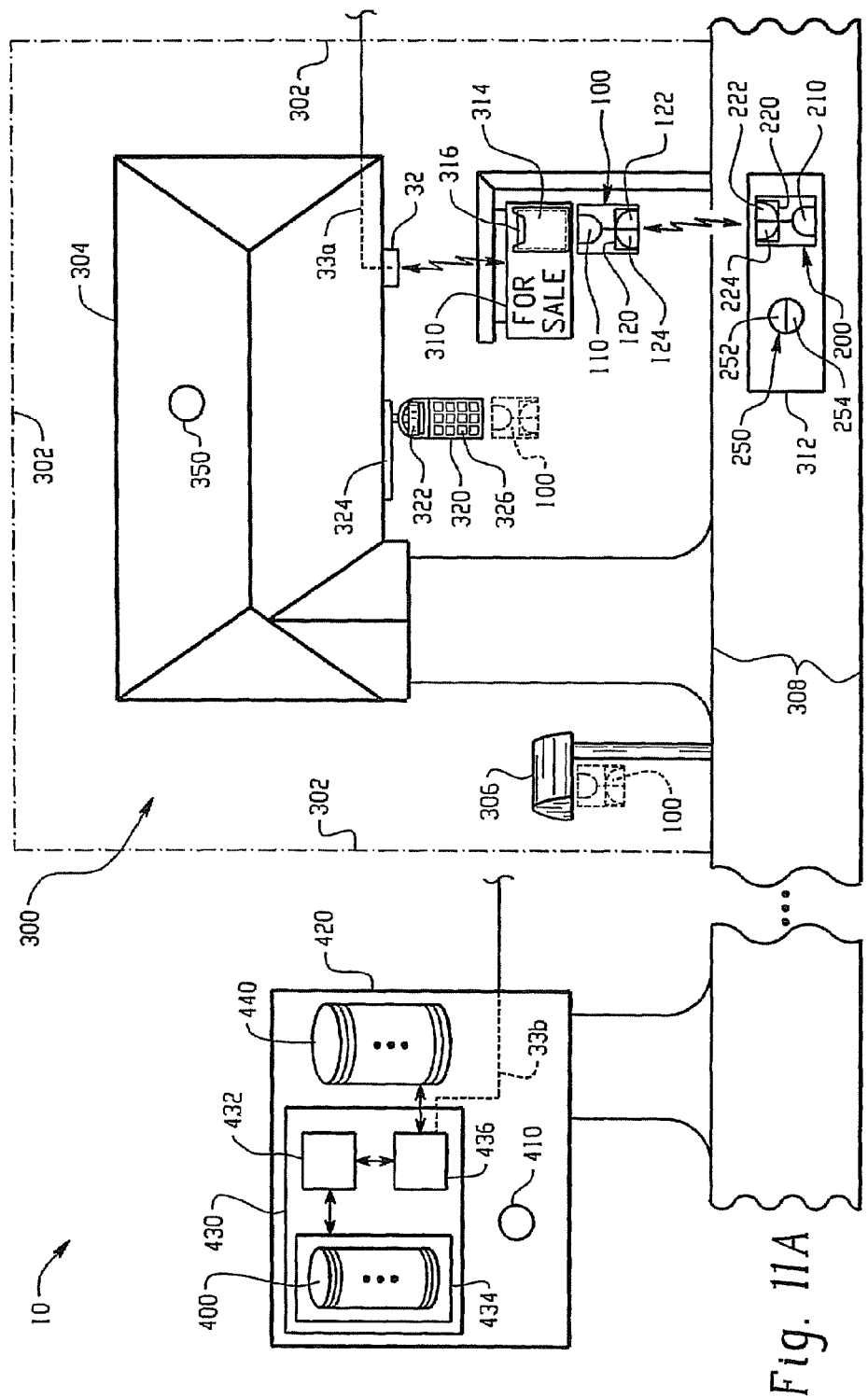
FIG. 11A is another illustrative embodiment of the system, wherein the first data device communicates with the property manager computer through a telephone network.

FIG. 11A depicts another illustrative embodiment of the invention. A telephone communication device 32 is attached to the house 304. The telephone communication device 32 is coupled to a telephone line 33a located in the house 304, and the communication device 436 of the computer 430 is connected to a telephone line 33b located in the real estate office 420. The telephone communication device 32 is operable to communicate with the communication subsystem 120 of the first data device 100, and to communicate with the computer 430 through the telephone lines 33a and 33b. Data transmission and reception between the first data device 100, the telephone communication device 32, and the second data device 200 can conform to a known standard, such as IEEE 802.11b, IrDA infrared, or can be carried out according to a proprietary transmission scheme. Accordingly, appointment data, scheduling data, and update data are communicated between the first data device 100 and the computer 430 via the telephone communication device 32 and the telephone lines 33a and 33b.

Figure 11B:
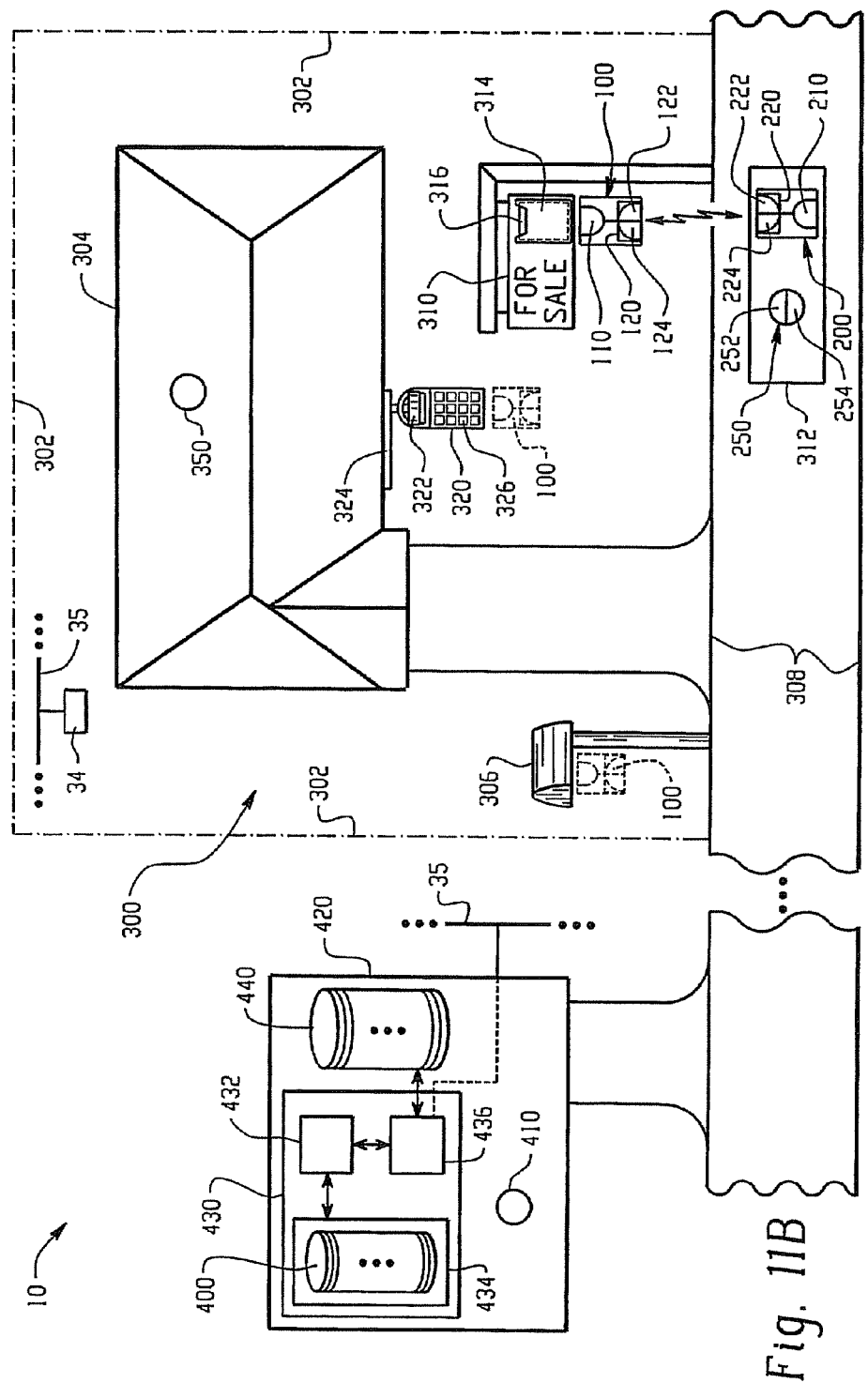
FIG. 11B is yet another illustrative embodiment of the system, wherein the first data device communicates with the property manager computer through a wireless LAN.

FIG. 11B depicts yet another illustrative embodiment utilizing a typical 802.11 wireless LAN. An access point 34 of a wireless LAN is placed in the vicinity of the property 300, and the first communication subsystem 120 and the second communication subsystem 220 are wireless LAN transceivers in communication with access point 34. The access point 34 is coupled to a distribution system 35. The communication device 314 of the computer 430 is likewise coupled to the distribution system 35, and thus communicates with the first data device 100 over the distribution system 35 and access point 34.

Another embodiment includes the gathering of buyer feedback for a property 300. The user 250 may provide feedback via the second data device 200 to the first data device 100. Alternatively, feedback information may be transmitted from the second data device 200 to the information database 400. The feedback may include favorable or unfavorable opinion data about the property 300. The feedback information is then stored in the information database 400 and can be used to generate further reports related to the property 300. The user 250 may provide the feedback information voluntarily, or the user 250 may be offered an incentive to provide the information.

The user 250 may also send via the second data device 200 an offer or request to purchase the property 300. Through the input/output device 240, the user 250 may send a purchase signal as an offer to purchase the property 300. Upon receiving the purchase signal, the first communication subsystem 120 of the first data device 100 transmits the purchase signal to the computer 430. The purchase signal may also include user account information authorizing the seller 350 or listing agent 410 to charge a deposit amount to the user account. For example, the user 250 may send a purchase signal to request purchasing the property 300, and may authorize the seller 350 or listing agent 410 to charge an earnest money deposit to the user's 250 credit card. Acceptance or rejection of the user's 250 offer is then transmitted back to the second data device 200 as previously described with reference to acceptance or rejection of an appointment.

Yet another embodiment of the invention includes storing an approved list of users 250 which may receive property information data sets from the first data device 100. Thus, if the identification data identifies the user 250 as either a buyer 252 or a selling agent 254, a property information data set may still not be provided unless the buyer 252 or a selling agent 254 is listed on an approved list of users. For example, a listing agent 410 may offer a subscription service to which selling agents 254 may subscribe. A list of the selling agents 254 subscribing to the service may be stored in the first storage device 110. Alternatively, the list may be stored in the information database 400 and is accessed by the first data device 100 via the first communication subsystem 120.

The selling agent 254 may posses a plurality of second data devices 200 storing data identifying each second data device 200 as a subscription second data device 200 and identifying the selling agent 254 as the subscriber. The subscription second data devices 200 may also store farther identification data related to a buyer 252 or the selling agent 254.

Corresponding information data sets may then be provided to each subscription second data device 200. Thus, when a buyer 252 engages a selling agent 254, the selling agent may provide the buyer 252 with a subscription second data device 200. Accordingly, the buyer 252 may obtain buyer information data sets, and the selling agent 254 may likewise obtain agent information data sets as long as the selling agent subscribes to the service.

The subscription service may be provided free of charge, or may be provided upon payment of a subscription fee. The fee may be a monthly fee, or may be charged on a per-use basis for each transaction between the first data device 100 and a subscription second data device 200.

In yet another embodiment, the approved list of users 250 is a list of licensed real estate agents. If the user 250 of the second data device 200 is not a licensed real estate agent, or associated with a licensed agent, then the first data device 100 will not provide property information data sets in response to a request from the second data device 200. Note that the listing agent 410 may also be included in the list of licensed real estate agents, and thus the first data device 100 will not provide property information data sets in response to a request from the second data device 200 used by a listing agent 410 that is not included in the list of licensed real estate agents.

Figure 12:
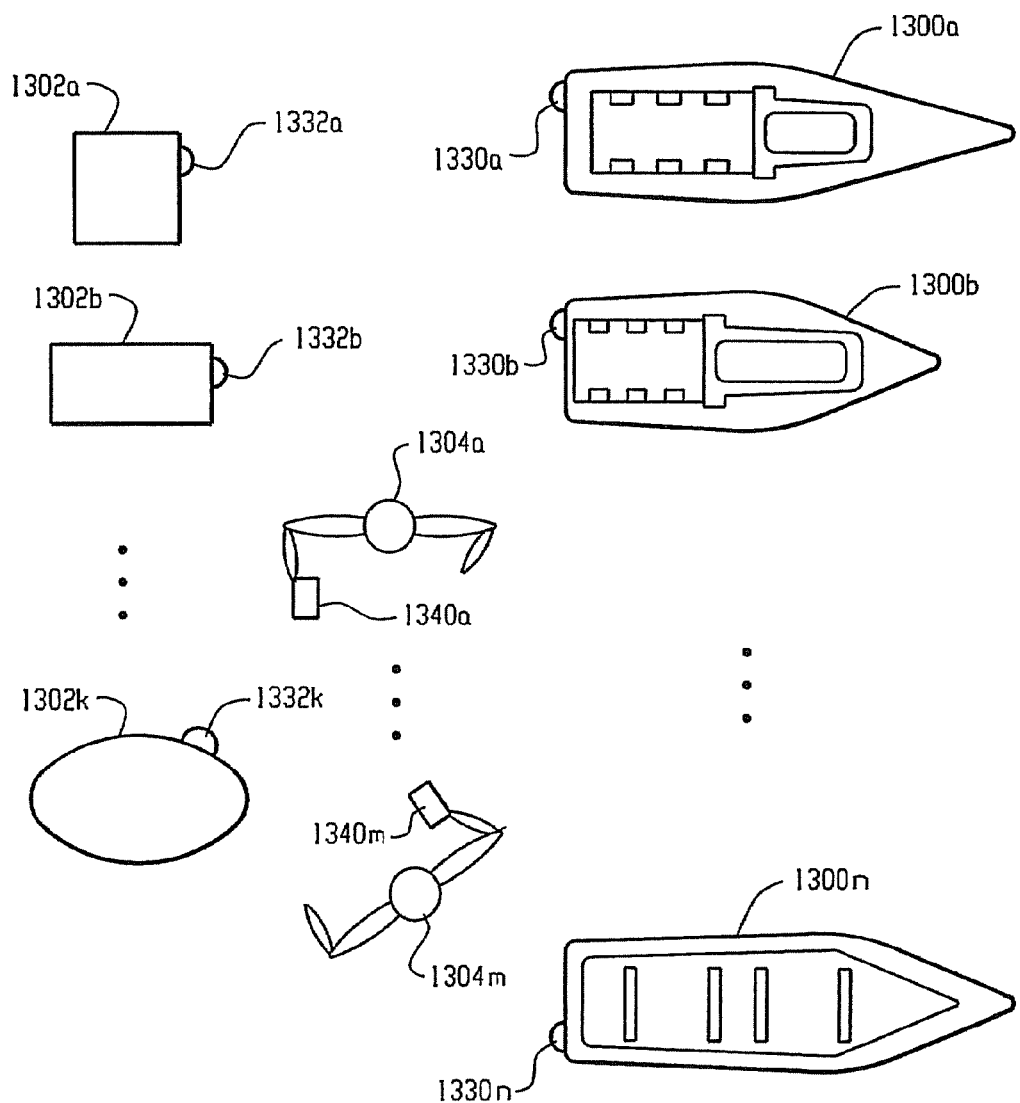
FIG. 12 depicts yet another illustrative embodiment of the system in which a plurality of buyers exchange information relating to a plurality of consumer products.

While the invention has been described in detail with reference to the illustrated embodiments directed to the exchange of information relating to real estate between real estate sellers and potential real estate buyers, another embodiment of the invention facilitates the exchange of information relating to products displayed at a consumer show. FIG. 12 depicts a consumer boat show that includes a display of a plurality of boats 1300a . . . 1300n, and a display of a plurality of peripheral boating equipment 1302a . . . 1302k. The plurality of boats 1300a . . . 1300n and the plurality of peripheral boating equipment 1302a . . . 1302k collectively define a set of assets. The first data devices 1330a . . . 1330n are associated with the plurality of boats 1300a . . . 1300n. Each first data device 1330 stores information related to an associated boat 1300, such as price, the manufacturer's web site, and the vendor's web site. Similarly, the first data devices 1332a . . .

1332k are associated with the plurality of peripheral boating equipment 1302a . . . 1302k. Each first data device 1332 stores information related to associated peripheral boat equipment 1302, such as price, the manufacturer's web site, and the vendor's web site.

Prospective buyers 1304a . . . 1304m are provided with corresponding second data devices 1340a . . . 1340m. Each buyer 1304 inputs pertinent information into the second data device 1340, such as the buyer's name, mailing address, age, telephone number, and e-mail address. As the buyer 1304 examines boats 1300 and peripheral boating equipment 1302, the buyer selects boats 1300 and peripheral boating equipment 1302 of interest. The buyer 1304 then exchanges information between the first data devices 1330 and 1332 and the second data device 1340 for each boat 1300 and peripheral boating equipment 1302 of interest. The buyer 1304 may then examine the buyer information provided, and may later download the information to a personal computer. The buyer 1304 then has available on his personal computer information related to the products of interest, and the web sites of the manufacturers and vendors of the products. The buyer 1304 then may visit these web sites for further product information.

From the buyer data collected in the first data devices 1330a . . . 1330n and 1332a . . . 1332n, manufacturers and vendors are provided a list of interested buyers 1304 and the respective buyer contact information. The manufacturers and vendors may then directly contact interested buyers 1304, examine demographic data relating to interested buyers, or send e-mail messages relating to the products of interest to the buyers.

In another embodiment, the second data device 1340 is operable to send a "buy" signal upon the buyer's 1304 command. The buy signal indicates that the buyer 1304 desires to purchase a product currently selected or viewed by the buyer on the second data device 1340. The buyer 1304 may have authorized the vendors or consumer show representative to automatically charge an account associated with the buyer 1304, or, alternatively, the buyer 1304 may meet with representatives of the vendor or consumer show to finalize a purchase agreement at a later time.

In yet another embodiment, the first and second data devices 1330 and 1340 facilitate the distribution of asset information in a museum. A first data device 1330 is located near a museum piece, and a second data device 1340 is provided to a museum patron. The museum patron may then obtain detailed information about a museum piece of interest through the first data device 1330 and the second data device 1340.

The embodiments described herein are examples of structures, systems or methods having elements corresponding to the elements of the invention recited in the claims. This written description may enable those of ordinary skill in the art to make and use embodiments having alternative elements that likewise correspond to the elements of the invention received in the claims. The intended scope of the invention thus includes other structures, systems or methods that do not differ from the literal language of the claims, and further includes other structures, systems or methods with insubstantial differences from the literal language of the claims.

What is claimed is:

1. A system for marketing real estate, comprising:
a property data device located in a vicinity of a real estate property, the property data device comprising a first storage device for storing property information data related to the real estate property, and a first communication subsystem having a transmitter and receiver, the property data device operable to receive identification data, generate a property information data set based on the identification data and the property information data, and transmit the property information data set;
a personal data device to be provided to a user, comprising a second storage device for storing the identification data, and a second communication subsystem having a transmitter and receiver, the personal data device operable to transmit the identification data, receive the property information data set transmitted by the property data device, and store the property information data set in the second storage device, wherein the identification data includes user information data related to the user, and the property data device is further operable to store the identification data in the first storage device; and
a computer including a third storage device for storing an information database, the information database the identification received by the property data device and the property information data and a communication device operable to transmit and receive data, wherein the computer is operable to generate reports from the identification data and the property information data stored in the information database;
wherein the property data device is further operable to transmit the identification data received from the personal data device to the computer; and the computer is further operable to receive and store in the information database the identification data transmitted from the property data device;
wherein the personal data device further comprises an input/output device, and the personal data device is further operable to transmit appointment request data relating to a requested appointment, receive appointment reply data related to the requested appointment, and provide indicia of an acceptance or rejection of the requested appointment based on the appointment reply data;
wherein the first storage device of the property data device is further operable for storing appointment availability data, and is further operable to receive the appointment request data transmitted from the personal data device, compare the appointment request data to the appointment availability data, generate the appointment reply data based on the comparison, and transmit the appointment reply data to the personal data device.

2. The system of claim 1, further comprising: a second communication device located in the vicinity of the real estate property, the second communication device operable to transmit data to and receive data from the computer and transmit data to and receive data from the property data device; wherein the property data device is further operable to transmit the identification data received from the personal data device to the second communication device; and the computer is further operable to receive and store in the information database the identification data received by the second communication device.

3. The system of claim 2, wherein the communication device of the computer and the second communication device are coupled to a telephone network.

4. The system of claim 2, wherein the communication device of the computer and the second communication device comprise a wireless LAN.

5. The system of claim 1, wherein: the third storage device of the computer is further operable for storing updated property information data, and the computer is further operable to transmit the updated property information data to the property data device; and the property data device is further operable to store in the first storage device the updated property information data.

6. The system of claim 1, wherein: the second storage device of the personal data device is further operable for storing updated property information data, and the personal data device is further operable to transmit the updated property information data with the identification data; and the property data device is further operable to receive and store in the first storage device the updated property information data based on the identification data.

7. The system of claim 1, wherein the personal data device further comprises an input/output device, and the personal data device is further operable to transmit purchase request data relating to an offer to purchase the property.

8. The system of claim 1, wherein the personal data device further comprises a first input/output device including a display, and the personal data device is further operable to display the property information data set.

9. The system of claim 8, wherein the input/output device further includes a printer, and the personal data device is further operable to print the property information data set.

10. The system of claim 8, wherein: the personal data device further comprises a first communication port, and the personal data device is further operable to transmit the property information data set stored in the second storage device over the first communication port; and a personal computer comprising a third storage device for storing data and a second communication port, the personal computer operable to receive the property information data set from the personal data device by connecting the second communication port to the first communication port, and further operable to store in the third storage device the property information data set.

11. The system of claim 1, wherein the property data device generates the property information data set by providing an agent information data set when the identification data classifies the user as an agent, and by providing a buyer information data set when the identification data classifies the user as a buyer.

12. A system for marketing real estate, comprising:
a property data device located in the vicinity of a real estate property, the property data device comprising a first storage device for storing property information data related to the real estate property, and a first communication subsystem having a transmitter and receiver, the property data device operable to receive identification data, generate a property information data set based on the identification data and the property information data, and transmit the property information data set; and
a personal data device to be provided to a user, comprising a second storage device for storing the identification data, and a second communication subsystem having a transmitter and receiver, the personal data device operable to transmit the identification data, receive the property information data set transmitted by the property data device, and store the property information data set in the second storage device, wherein the identification data includes user information data related to the user, and the property data device is further operable to store the identification data in the first storage device;
a computer including a third storage device for storing an information database, the information database storing the identification data received by the property data device and the property information data and a communication device operable to transmit and receive data, wherein the computer is operable to generate reports from the identification data and the property information data stored in the information database;
wherein the property data device is further operable to transmit the identification data received from the personal data device to the computer; and the computer is further operable to receive and store in the information database the identification data transmitted from the property data device;
wherein the personal data device further comprises an input/output device, and the personal data device is further operable to transmit appointment request data relating to a requested appointment, receive appointment reply data related to the requested appointment, and provide indicia of an acceptance or rejection of the requested appointment based on the appointment reply data;
wherein the property data device is further operable to receive the appointment request data transmitted from the personal data device, transmit the appointment request data to the computer, receive from the computer the appointment reply data, and transmit the appointment reply data to the personal data device; and the computer is further operable to receive the appointment request data transmitted by the property data device, receive indicia of acceptance or rejection of the requested appointment, generate the appointment reply data based on the received indicia, and transmit the appointment reply data to the property data device.

13. A system for marketing real estate, comprising:
a property data device located in the vicinity of a real estate property, the property data device comprising a first storage device for storing property information data related to the real estate property, and a first communication subsystem having a transmitter and receiver, the property data device operable to receive identification data, generate a property information data set based on the identification data and the property information data, and transmit the property information data set; and
a personal data device to be provided to a user, comprising a second storage device for storing the identification data, and a second communication subsystem having a transmitter and receiver, the personal data device operable to transmit the identification data, receive the property information data set transmitted by the property data device, and store the property information data set in the second storage device;
wherein the personal data device further comprises an input/output device, and the personal data device is further operable to transmit appointment request data relating to a requested appointment, receive appointment reply data related to the requested appointment, and provide indicia of an acceptance or rejection of the requested appointment based on the appointment reply data;
wherein the first storage device of the property data device is further operable for storing appointment availability data, and the property data device is further operable to receive the appointment request data transmitted from the personal data device, compare the appointment request data to the appointment availability data, generate the appointment reply data based on the comparison, and transmit the appointment reply data to the personal data device.

14. A system for marketing real estate, comprising:
a property data device located in the vicinity of a real estate property, the property data device comprising a first storage device for storing property information data related to the real estate property, and a first communication subsystem having a transmitter and receiver, the property data device operable to receive identification data, generate a property information data set based on the identification data and the property information data, and transmit the property information data set; and a personal data device to be provided to a user, comprising rising a second storage device for storing the identification data, and a second communication subsystem having a transmitter and receiver, the personal data device operable to transmit the identification data, receive the property information data set transmitted by the property data device, and store the property information data set in the second storage device;

wherein the personal data device further comprises an input/output device, and the personal data device is further operable to transmit appointment request data relating to a requested appointment, receive appointment reply data related to the requested appointment, and provide indicia of an acceptance or rejection of the requested appointment based on the appointment reply data;

further comprising a wireless communication device, the wireless communication device operable to receive the appointment request data transmitted from the personal data device, receive indicia of acceptance or rejection of the requested appointment, generate the appointment reply data based on the received indicia, and transmit the appointment reply data to the personal data device.

* * * * *